(12) United States Patent
Widell et al.

(10) Patent No.: US 9,307,447 B2
(45) Date of Patent: Apr. 5, 2016

(54) ENHANCED EXTENDED ACCESS CLASS BARRING

(71) Applicant: TELEFONAKTIEBOLAGET L M ERICSSON (PUBL), Stockholm (SE)

(72) Inventors: Daniel Widell, Vikbolandet (SE); John Walter Diachina, Garner, NC (US); Paul Schliwa-Bertling, Ljungsbro (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 282 days.

(21) Appl. No.: 14/016,888

(22) Filed: Sep. 3, 2013

(65) Prior Publication Data
US 2014/0120938 A1    May 1, 2014

Related U.S. Application Data

(60) Provisional application No. 61/720,566, filed on Oct. 31, 2012.

(51) Int. Cl.
| | | |
|---|---|---|
| *H04W 28/08* | (2009.01) | |
| *H04L 5/00* | (2006.01) | |
| *H04W 48/02* | (2009.01) | |
| H04W 74/08 | (2009.01) | |
| H04W 28/18 | (2009.01) | |
| H04W 72/00 | (2009.01) | |

(52) U.S. Cl.
CPC .............. *H04W 28/08* (2013.01); *H04L 5/003* (2013.01); *H04W 48/02* (2013.01); *H04W 28/18* (2013.01); *H04W 72/00* (2013.01); *H04W 74/0833* (2013.01)

(58) Field of Classification Search
CPC .............. H04W 72/04; H04W 72/048; H04W 72/0486; H04W 72/0493; H04W 72/06; H04W 72/10; H04W 4/005; H04W 48/08; H04W 28/08; H04W 28/0215; H04L 5/003
USPC .......... 455/450, 453, 455; 370/328, 329, 330, 370/436, 437, 455
See application file for complete search history.

(56) References Cited

U.S. PATENT DOCUMENTS

| | | | |
|---|---|---|---|
| 8,478,286 B1* | 7/2013 | Fan .................... | H04W 72/0446 455/410 |
| 8,634,830 B2* | 1/2014 | Christensson et al. ........ | 455/434 |
| 2011/0235558 A1* | 9/2011 | Diachina et al. .............. | 370/310 |
| 2011/0274040 A1* | 11/2011 | Pani et al. ..................... | 370/328 |
| 2011/0302310 A1 | 12/2011 | Diachina et al. | |
| 2012/0039171 A1* | 2/2012 | Yamada .................. | H04L 47/12 370/232 |
| 2013/0107778 A1* | 5/2013 | Ryu ....................... | H04W 48/02 370/311 |
| 2013/0115913 A1* | 5/2013 | Lin ........................ | H04W 48/08 455/410 |
| 2013/0215742 A1* | 8/2013 | Sirotkin ............ | H04W 28/0247 370/230 |
| 2014/0010180 A1* | 1/2014 | Lee et al. ...................... | 370/329 |
| 2014/0370890 A1* | 12/2014 | Huang et al. .................. | 455/434 |

FOREIGN PATENT DOCUMENTS

WO    WO 2013020778 A1 *    2/2013    ............ H04W 48/06

* cited by examiner

*Primary Examiner* — Magdi Elhag (57) ABSTRACT

A method is implemented in a mobile device for managing access to resources of a cellular communication system. The cellular communication system includes a plurality of base stations providing wireless access to the resources of the cellular communication system. The mobile device implements an enhanced extended access class barring (EEAB) process to minimize overloading of the resources of the cellular communication system.

18 Claims, 5 Drawing Sheets

ENHANCED EXTENDED ACCESS CLASS BARRING

CROSS-REFERENCE TO RELATED APPLICATION

Cross-reference is made to a U.S. provisional patent application 61/720,566 filed on Oct. 31, 2012 and commonly owned. The cross-referenced application is incorporated herein by reference.

FIELD OF THE INVENTION

The embodiments of the invention relate to a method and apparatus for extended access class barring. Specifically, the embodiments of the invention relate to a method for enhancing extended access class barring (EAB) that introduces an implicit rotation of an EAB mask such that the mobile devices implement the rotation asynchronously. The resulting percentage of mobile devices targeted for barring remains unchanged, but the potential for overload situations are diminished.

BACKGROUND

Extended access class barring (EAB), is used today to handle overload situations in cellular communication systems. These overload situations can occur where mobile devices connected to the cellular communication system require data services in excess of what can be supported by the cellular communication system at a given time. EAB functions via mobile devices that are connected to cellular communication system and are configured to support EAB. The mobile devices are grouped into N different 'access classes' where the percentage of mobile devices will be approximately the same for the subset of access classes used to support normal priority mobile devices. There may also be a subset of access classes used to support higher priority mobile devices which may represent a relatively small percentage of the overall mobile devices supported by the cellular communication system (these mobile devices and their corresponding access classes are not further discussed herein). Each of the access classes corresponding to normal priority devices can be separately "barred" from accessing the cellular communication system and thereby prevented from requesting resources for either voice or data communication from base stations and similar components of the cellular communications system.

As different groups of mobile devices (i.e. one or more access classes) are prevented from accessing the cellular communication system resources, the cellular communication system can decrease the load on itself, and thereby prevent the system from being overloaded. In other words, the cellular communication system is able to block subsets of the connected mobile devices from using the system resources according to their assigned access class, which staggers the load on the system over time as the mobile devices in the barred access classes must wait until their respective access classes are no longer barred from accessing system resources at which point in time other access classes are likely to be barred. For example, if 10 access classes are used to support all mobile devices (normal priority) then each of these access classes would represent about 10% of the total number of mobile devices in which case the network would bar 20% of them by setting EAB content to indicate that any 2 of these access classes are barred.

EAB is controlled by broadcasting a so called EAB mask via the base stations of the cellular communication system. The EAB mask indicates which access classes are barred at a given time. This broadcast of the EAB mask occurs periodically. For example, in global systems for communication (GSM) or enhanced data rates for GSM evolution (EDGE) networks it is broadcast at least once every eight seconds and when acquired by a mobile device it will not be re-acquired for another 30 seconds. In other words, for a mobile device connected to an GSM/EDGE base station, the nominal refresh interval for system information is 30 seconds. Further, the EAB mask provides a coarse quantization in steps of 10% (i.e., the system can bar 10%, 20%, up to 100%) of all mobile devices supporting EAB.

Any subset of mobile devices that have received the same EAB mask will continue to apply that same EAB mask until the next time the mobile device refreshes its system information (i.e. once barred as a result of reading the same EAB mask all the subset of mobile devices will become synchronized as they will utilize the same future instance of the EAB mask to update their EAB mask and thereby determine if their accesses are still barred). This can result in the case where one or more previously barred access classes are determined to be "un-barred" at the same point in time (i.e., when multiple currently barred mobile devices read the same future EAB mask and thereby determine they are no longer barred) so that there can potentially be a large number of mobile devices making simultaneous access to the cellular communication system, which in turn can cause an overload situation. This overload can also arise as a result of the synchronized mobile devices saving (instead of deleting) the payload associated with each barred access attempt experienced during the 30 second system information refresh period (i.e., once a mobile device determines that it is barred it still retains the uplink payload that triggered the access attempt in the hope that it can be still be transmitted at a future point).

SUMMARY

A method is implemented in a mobile device for managing access to resources of a cellular communication system. The cellular communication system includes a plurality of base stations providing wireless access to the resources of the cellular communication system. The mobile device implements an enhanced extended access class barring (EEAB) process to minimize overloading of the resources of the cellular communication system. The implemented method includes receiving system information from one of the plurality of base stations. The system information includes an EAB mask and a shared rotation interval parameter. An implicit EAB mask is set for the mobile device using the received EAB mask, where the implicit EAB mask serves as a local working copy of the EAB mask. A random offset is calculated using the received shared rotation interval parameter. An offset timer is then started using the random offset. A check is made of the implicit EAB mask to determine whether a class of the mobile device is barred. If the class of the mobile device is not barred, then the mobile device enables data access to the resources of the cellular communication system while the offset timer is active. If the class of the mobile device is barred, then data access is barred to the resources of the cellular communication system while the offset timer is active. A check is made whether the offset timer has expired. If the offset timer has expired, then the mobile device updates the implicit EAB mask by shifting the implicit EAB mask, otherwise it continuing to check for the offset timer to expire.

A mobile device is presented for managing access to resources of a cellular communication system. The cellular communication system includes a plurality of base stations providing wireless access to the resources of the cellular communication system. The mobile device implements an enhanced extended access class barring (EEAB) process to minimize overloading of the resources of the cellular communication system. The mobile device includes a transceiver configured to receive system information from one of the plurality of base stations. The system information includes an EAB mask and a shared rotation interval parameter. The mobile device also includes a memory device to store an implicit EAB mask for the mobile device derived from the received EAB mask and a mobile device processor configured to execute an EAB manager. The EAB manager is configured to set an implicit EAB mask for the mobile device using the received EAB mask, where the implicit EAB mask serves as a local working copy of the EAB mask. The EAB manager is also configured to calculate a random offset using the received shared rotation interval parameter, to start an offset timer using the random offset, and to check the implicit EAB mask to determine whether a class of the mobile device is barred. If the class of the mobile device is not barred, then the EAB manager is configured to enable data access to the resources of the cellular communication system. If the class of the mobile device is barred, then the EAB manager is configured to bar data access to the resources of the cellular communication system. The EAB manager also checks whether the offset timer has expired, if the offset timer has expired, then it updates the implicit EAB mask by shifting the implicit EAB mask, otherwise it continues to check for the offset timer to expire.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiment of the figures. However, it should be understood that the operations of the flow diagrams can be performed by embodiments of the invention other than those discussed with reference to the figures, and the embodiments discussed with reference to the figures can perform operations different than those discussed with reference to the flow diagrams of the figures. Some of the figures provide example topologies and scenarios that illustrate the implementation of the principles and structures of the other figures.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The disadvantages of the prior art include scenarios where the legacy EAB process does not alleviate overloading of the resources of the cellular communication system due to synchronization in the mobile devices causing large numbers of the mobile devices to access the resources at the same time after the period during which they are barred ends. The legacy EAB process is controlled by broadcasting an EAB mask, indicating which access classes are being barred. The problem is that this broadcast occurs periodically, e.g. for GSM/EDGE networks it is broadcasted at least once every 8 seconds and when acquired by a mobile station it will not be re-acquired for another 30 seconds (i.e. for GSM/EDGE mobile stations the nominal refresh interval for system information is 30 seconds). Further, the EAB mask provides a coarse quantization in steps of 10% (i.e., the system can bar 10%, 20%, or up to 100%) of all mobile devices supporting EAB. Any subset of mobile devices that have read the same EAB mask to determine the current setting of the EAB mask will continue to apply that same EAB mask until the next time the mobile device refreshes its system information (i.e. once barred, all the subset of barred mobile devices will become synchronized as the subset will be utilizing the same future instance of the EAB mask to determine if their accesses are still barred). This can result in the case where one or more previously barred access classes are determined to be "unbarred" at the same point in time (i.e. when the subset of barred mobile devices read the same future instance of the EAB mask) so that there can potentially be a large number of mobile devices making simultaneous access to the cellular communication system, which in turn can cause an overload situation. This overload can also arise as a result of the synchronized mobile devices saving (instead of deleting) the payload associated with each barred access attempt experienced during one or more consecutive instances of the 30 second system information refresh period.

These disadvantages of the prior art can be overcome by the embodiments of the present invention. The embodiments of the invention avoid these overload situation by introducing an implicit rotation of the EAB mask, where the EAB mask that is read from system information is implicitly rotated cyclically by each mobile device supporting enhanced EAB thereby establishing what is referred to as a mobile device specific implicit EAB mask. Further, the embodiments provide that when an EAB mask is read and an implicit EAB mask is activated, the initiation of the rotation of the implicit EAB mask is also determined by a pseudo-random offset. This will result in all mobile devices avoiding rotating their implicit EAB mask in a synchronized manner. The frequency with which the mobile devices rotate their implicit EAB mask is determined by a broadcasted message (e.g. system information). It should be noted that the percentage of mobile devices targeted for barring by the network (indicated by the EAB mask sent in the system information) remains effectively unchanged even when these devices make use of a rotating implicit EAB mask during the nominal period associated with re-acquiring system information.

The embodiments provide advantages over the limitations of the standard (legacy) EAB process. Contrary to using an EAB mask that is only updated when system information is re-acquired by a mobile device, it is possible to make use of an implicit EAB mask to avoid instantaneous overload as would otherwise happen when a group of devices previously barred becomes eligible for system access again when system information is refreshed. The embodiments of the invention also enable performance closer to that associated with using an uniformed delay back-off, as the Enhanced EAB process will not absolutely bar a mobile device, but will instead effectively introduce a back-off time before it updates its implicit EAB mask at which point it potentially becomes eligible for making system access prior to re-reading the EAB mask from system information.

Figure 1:
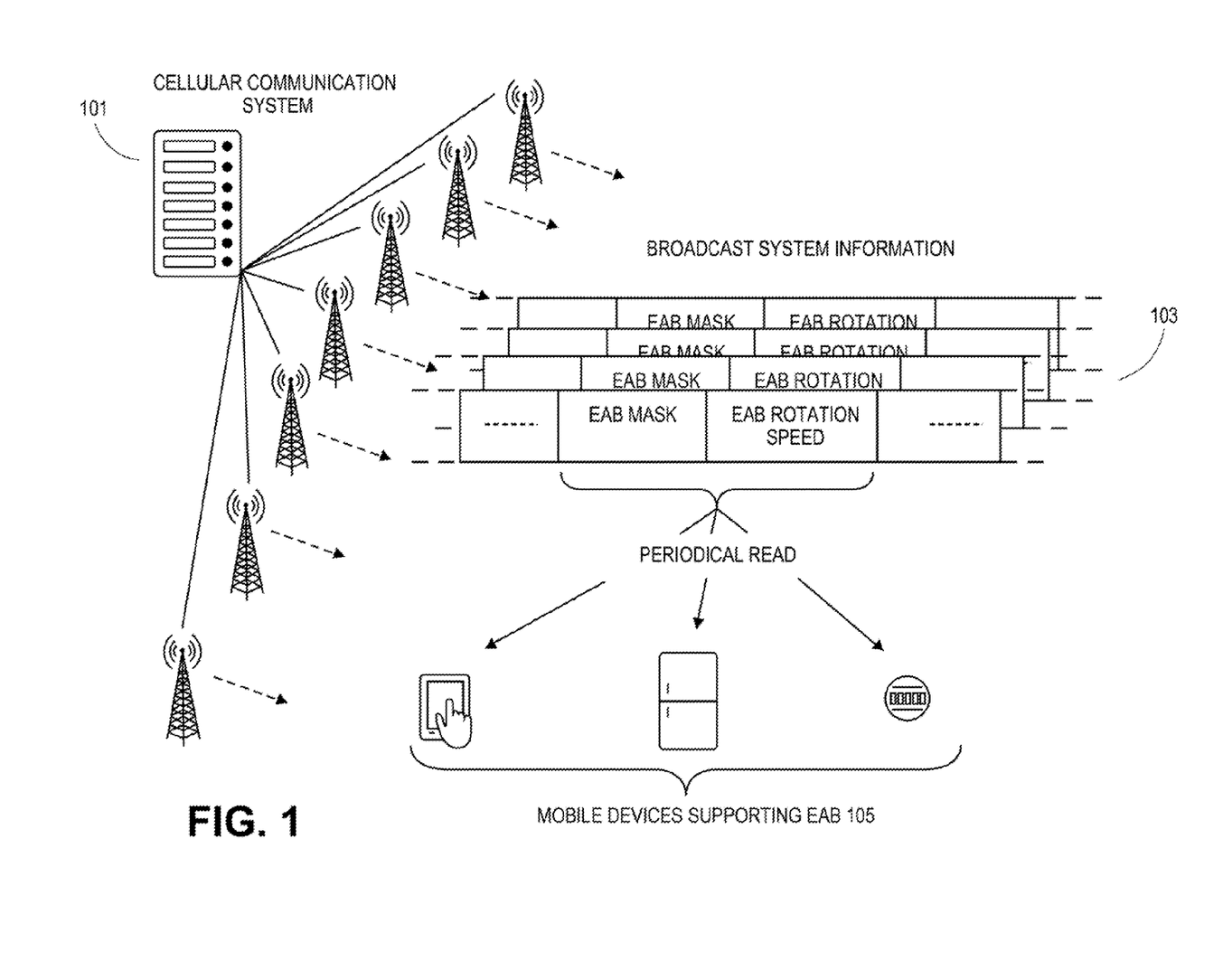
FIG. 1 is a diagram of one embodiment of a cellular communication system.

FIG. 1 is a diagram of one embodiment of a cellular communication system. The cellular communication system 101 provides wireless communication to a set of mobile devices 105. The cellular communication system 101 can include any backbone network connecting a set of base stations and antennas to a packet switched and/or circuit switched network to provide data and voice communication to the set of mobile devices 105. A 'set,' as used herein refers to any positive whole number of items including one item. A cellular communication system 101 can have any size and geographic range or scale. Similarly, the cellular communication system 101 can provide data and voice services to any number and type of mobile devices 105.

The cellular communication system 101 can implement any type of communication protocols and architecture, for example, global system for mobile communication (GSM)/enhanced data rates for GSM evolution (EDGE), wideband code division multiple access (WCDMA)/high speed packet access (HSPA) or long term evolution (LTE), and similar technologies. The cellular communication systems can broadcast system information to the mobile devices in their broadcast range. The system information 103 can contain an EAB mask. The system information 103 including the EAB mask can be broadcasted periodically by the cellular communications system's cells (i.e., base stations and antennas).

The embodiments include broadcasting system information 103 to the mobile devices 105 with "frequency of rotation" information to be associated with an implicit EAB mask derived from this broadcasted EAB mask. The frequency of rotation values thus functions as an EAB rotation speed. The EAB rotation speed indicates how often an implicit EAB mask derived from the broadcast EAB should be cyclically rotated by the mobile device. The EAB rotation speed can be an absolute value or relative value. In one embodiment, the EAB rotation speed is relative to the nominal periodicity for re-acquiring the EAB mask from system information (i.e. how often the mobile device reads system information from the cellular communication system).

The mobile devices 105 that are in communication with the cellular communication system 101 can be any type of devices capable of communication with cellular communication systems 101. Examples of such mobile devices include smartphones, tablets, laptop computers, home appliances, networking devices and similar devices capable of cellular communication. The mobile devices 105 can support the EAB process (i.e., some may support the legacy EAB process and some may support the enhanced EAB process), where the mobile devices 105 bar or block their own communication with the resources of the cellular communication system 101. This can be a bar on data and/or voice communications or similar limit on communication with the cellular communication system 101.

The EAB process manages load on the resources of the cellular communication system 101 by limiting access to various 'classes' or groups of mobile devices in order to spread the accesses out into blocked time periods. The EAB mask is a set of bits where each bit corresponds to a particular class. When the bit is logically on or set, then the corresponding class of mobile devices can access the cellular communication system. When the bit is logically off or cleared, then the corresponding class of mobile devices cannot access the cellular communication system. Each mobile device can be associated with a single class or with a set of classes by any type of configuration or characteristics associated with the mobile device or user, such as device type, unique identifier or similar information.

An implicit EAB mask is a local EAB mask generated by a mobile device that supports the enhanced EAB process. The implicit EAB mask can be derived from the broadcast EAB mask in the system information received by the mobile device. The rotation of the implicit EAB mask is a functional attribute limited to mobile devices that support the enhanced EAB process and is discussed herein below.

Figure 2:
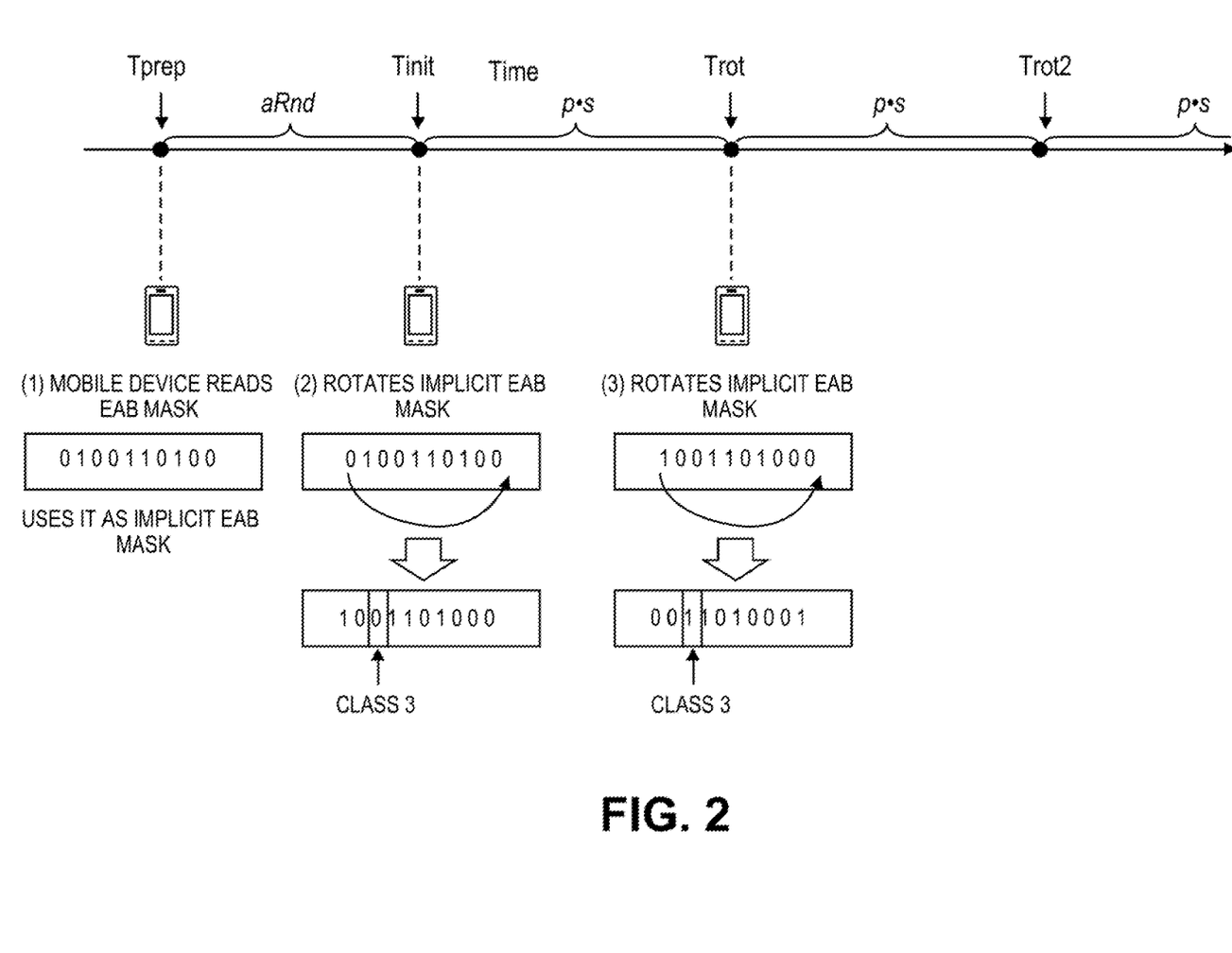
FIG. 2 is a diagram of one embodiment of an implicit EAB shifting process.

FIG. 2 is a diagram of one embodiment of an implicit EAB shifting process. The mobile device in advance knows the nominal periodicity, in seconds or similar unit, of how often the mobile device reads the broadcasted system information. This periodicity can vary from system to system or based on the technology or configuration of the cellular communication system. The periodicity can be denoted 'p' (e.g. p=30 seconds for GSM/EDGE mobile networks). This periodicity is universal for the cellular communication system and is thus a known shared interval amongst all of the mobile devices connected to the cellular communication system.

A rotation interval of the implicit EAB mask is determined using the product of an EAB rotation speed 's' (e.g. sent as part of system information) and the periodicity 'p'. The product p·s therefore identifies the shared rotation interval as all mobile devices that support the enhanced EAB process will use this product for setting the rotation timer $T_{rotation}$ (measured in seconds) which, upon expiration, will cause mobile devices to rotate their implicit EAB mask. The value of 's' can be either larger or smaller than 1, and can therefore result in the mobile device rotating its implicit EAB mask more or less often than it reads system information for EAB mask updates. The product of the shared interval 'p' and the EAB rotation speed 's' is referred to herein as the shared rotation interval. In other embodiments, the shared rotation interval can be explicitly broadcast rather than derived or derived using a different process such that all mobile devices in the cellular communication system can deterministically calculate the shared rotation interval.

As shown in FIG. 2, in one embodiment, upon first reception of an EAB mask from system information broadcast by the cellular communication system, the mobile device proceeds as follows:

(1) The mobile device sets its implicit EAB mask to the EAB mask read from the received system information and draws a random value, aRnd, from the uniform distribution (0, p·s). The mobile device then starts an offset timer $T_{offset}$ that starts at time $t=T_{prep}$, and expires after aRnd seconds, denoted in the figure as time $t=T_{init}$.

(2) Upon expiration of the offset timer at time $t=T_{init}$, the mobile device shifts (i.e. rotates) its implicit EAB mask, in this example using a left shift of the bits (i.e. it updates its implicit EAB mask such the $2^{nd}$ bit becomes the $1^{st}$ bit, the $3^{rd}$ bit becomes the $2^{nd}$ bit etc.), and starts a rotation timer $T_{rotation}$, that expires after shared rotation interval (p·s) seconds at time $t=T_{rot}$.

The ability to attempt access to cellular communication system resources while timer $T_{offset}$ or $T_{rotation}$ is running is governed by the value of the bit in the applicable implicit EAB mask corresponding to the configured access class of the mobile device. Prior to the expiration of offset timer $T_{offset}$ at $T_{init}$, the value of the bit within the implicit EAB mask corresponding to its access class (e.g., access class 3) is used to determine if it can attempt system access. Upon expiration of $T_{offset}$ at $t=T_{init}$, the mobile device will (a) rotate (shift) its implicit EAB mask and use the $3^{rd}$ bit of the updated implicit EAB mask shown in step (2) of FIG. 2 which has a value of "0", indicating that communication is not barred and (b) start the rotation timer.

(3) Upon expiration of the rotation timer $T_{rotation}$ at $T_{rot}$, the mobile device again shifts its implicit EAB mask, e.g., using a left-shift, and re-starts the rotation timer. Prior to the expiration of rotation timer at $T_{rot2}$, the value of the bit within the updated implicit EAB mask corresponding to its access class (e.g., access class 3) is used to determine if it can attempt system access. In this example, the bit in the updated implicit EAB mask corresponding to access class 3 is set to "1", indicating that communication is barred.

As long as the EAB feature is activated in the system the mobile device will continue to rotate its implicit EAB mask every p·s seconds (i.e., the shared rotation interval). If, upon re-acquiring system information, the mobile device determines that the system information broadcast contains a new EAB mask (i.e. the number of bit positions in the broadcast EAB mask set to "1" is different from the number of bit positions in its current implicit EAB mask set to "1") the entire procedure is re-started, with the mobile device picking a new aRnd and thereafter rotating its implicit EAB mask upon expiration of the offset timer and the rotation timer, i.e., at $T_{init}$ and $T_{rot}$, etc. as described above. In one embodiment, the EAB mask in the system information is replaced only if there is a more than a single bit difference in the EAB mask sent in system information and the implicit EAB mask (e.g., a change in access barring affecting more than 10% of mobile devices). Any threshold level can be utilized to determine the degree of difference between the current implicit EAB mask and the EAB mask received in system information required to trigger the update of the implicit EAB mask wherein the threshold level can be fixed or indicated as part of system information.

The implicit EAB mask is used by the mobile device for determining whether it is eligible for making a system access at any point in time. Upon attempting a system access and determining that it is barred according to the implicit EAB mask the mobile device will not re-evaluate its barring status until the next time it rotates its implicit EAB mask. A flowchart for the entire procedure is depicted herein below with regard to FIGS. 3A and 3B.

Figure 3A:
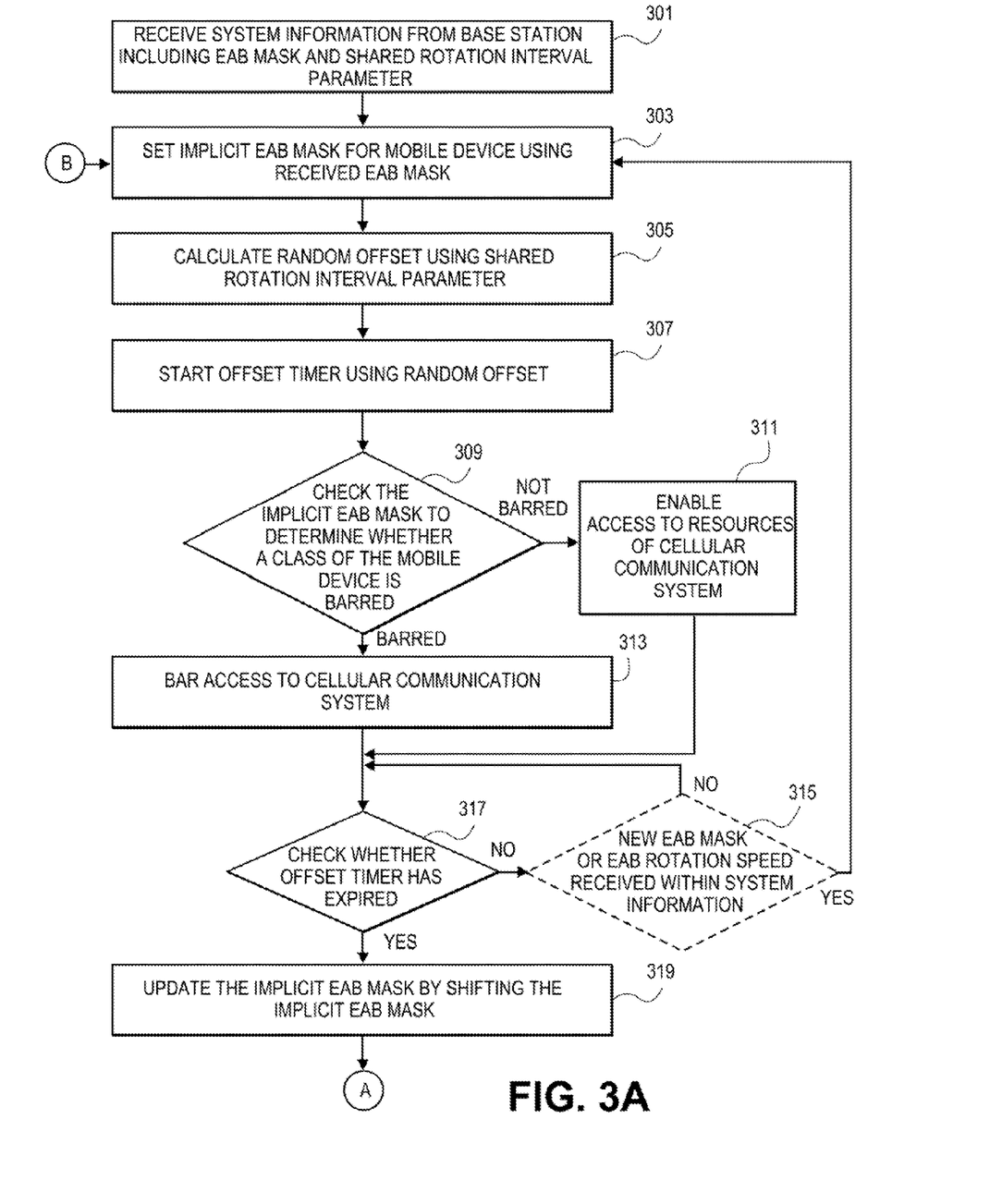
FIG. 3A is a flowchart of one embodiment of a process for implicit EAB shifting showing the offset timer process.

FIG. 3A is a flowchart of one embodiment of an offset process for implicit EAB shifting. In one embodiment, the initial portion of the offset process relates to the management of the offset timer ($T_{offset}$) as shown in FIG. 3A. The offset process then transitions to the rotation process which relates to rotation timer ($T_{rotation}$) management as shown herein below with regard to FIG. 3B. These processes are executed by mobile devices supporting the enhanced EAB process in communication with a cellular communication system supporting the enhanced EAB process. The processes taken as a whole can be referred to as an enhanced extended access class barring (EEAB) process.

The process begins with the receipt of system information from a base station (Block 301). This initial receipt of system information can be after the startup or reset or the mobile device or under similar circumstances. The system information includes information related to the configuration and operation of the cellular communication system and includes an EAB mask that defines the classes of devices to be barred with each bit in the EAB mask corresponding to a different class and an EAB rotation speed parameter 's' that is used to determine the duration of timer $T_{offset}$ and $T_{rotation}$. The EAB rotation speed parameter 's' can be used to derive the shared rotation interval, which determines the duration of the timer $T_{rotation}$. In other embodiments, the shared rotation interval is explicitly included in the system information. As discussed above, the shared rotation interval can be calculated by multiplying an EAB rotation speed s by the periodicity of system information broadcast p.

The received EAB mask is utilized to set the implicit EAB mask for the mobile device (Block 303). The implicit EAB mask is a local working copy of the EAB mask for the mobile device that can be modified. A random offset is then calculated using the shared rotation interval (Block 305). In one embodiment, the random offset aRnd is calculated from the uniform distribution (0, p·s), i.e., a random value between 0 and the shared rotation interval. After the random offset is calculated it is used to start an offset timer $T_{offset}$ (Block 307) that runs (counts down) until expiration. When the offset timer $T_{offset}$ is started a check of the implicit EAB mask is made to determine whether the class of the mobile device has been barred or not barred (Block 309). In some embodiments, the mobile device can have multiple classes in which case there can be an order of preference, the mobile device can access the cellular communication system if any of its classes are not barred or a similar configuration can be implemented.

If the check of the implicit EAB mask indicates that the class of the mobile device is not barred, then while offset timer $T_{offset}$ is running the mobile device can access the resources of the cellular communication system (Block 311). Similarly, if the check of the implicit EAB mask indicates that the class of the mobile device is barred, then while offset timer $T_{offset}$ is running the mobile device cannot access the resources of the cellular communication system (Block 313). After determining whether or not it can access the resources of the cellular communication system the mobile device monitors the status of the offset timer $T_{offset}$ (Block 317). If additional system information is received while the offset timer $T_{offset}$ is running (Block 315) then the mobile device checks whether a newly received EAB mask is different than the implicit EAB mask of the mobile device (Block 315). The difference can be measured in terms of differences in set bits, percentage of set bits or similar comparison. If a new EAB mask or a new EAB rotation speed 's' parameter has been received, then the process restarts by setting the new EAB mask as the implicit EAB mask for the mobile device (Block 303). However, if a new EAB mask or a new EAB rotation speed 's' parameter is not received with the new system information, then the mobile device continues to monitor the status of the offset timer $T_{offset}$ (Block 317).

The offset timer continues to run (count down) until it expires (Block 317). After the expiration of the offset timer, the implicit EAB mask is updated by shifting the EAB mask (Block 319). The shift can be a left shift or right shift of the bits. The shift in either direction is cyclical with the bits 'falling' off one end being rotated to the other end of the set of bits such that the total number of 1's in the implicit EAB mask remains constant. In some embodiments, the shift can be a single bit shift, while in other embodiments, the shift can be a multiple bit shift. After the shift completes the process continues to the rotation timer process in FIG. 3B.

Figure 3B:
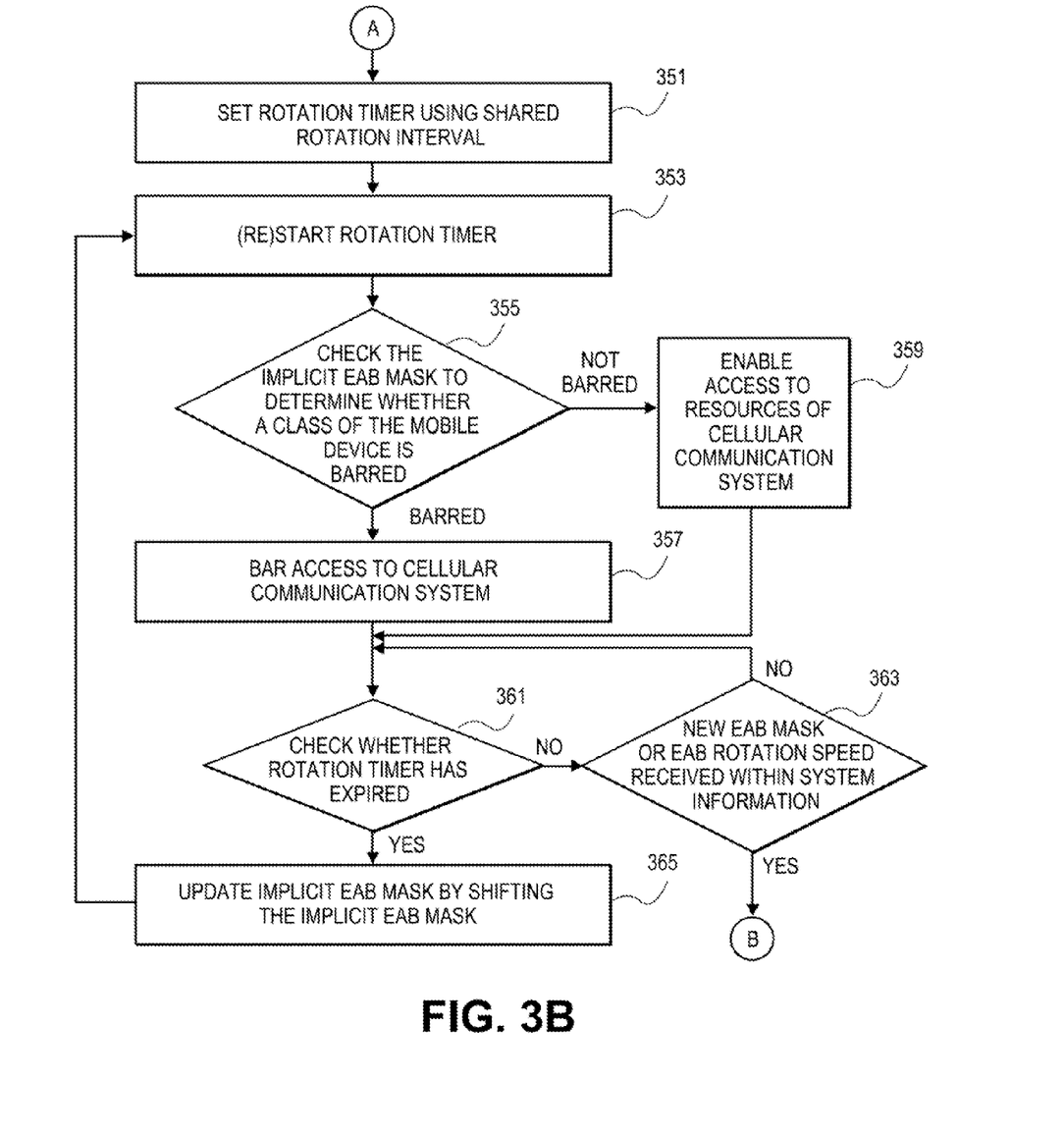
FIG. 3B is a flowchart of one embodiment of a process for implicit EAB shifting showing the rotation timer process.

FIG. 3B is a flowchart of one embodiment of a process for implicit EAB shifting showing the rotation timer process. The EEAB process continues after the completion of the offset process (shown in FIG. 3A) with the setting of a rotation timer using the shared rotation interval (Block 351). The EAB rotation speed parameter 's' can be used to derive the shared rotation interval. In other embodiments, the shared rotation interval is explicitly included in the system information. As discussed above, the shared rotation interval can be calculated by multiplying an EAB rotation speed 's' by the periodicity of system information broadcast 'p'.

After the rotation timer is set (Block 351) then the rotation timer is started (Block 353) and runs (counts down) until expiration. When the rotation counter $T_{rotation}$ is started a check of the implicit EAB mask is made to determine whether the class of the mobile device has been barred or not barred (Block 355). In some embodiments, the mobile device can have multiple classes in which case there can be an order of preference, the mobile device can access the cellular communication system if any of its classes are not barred or a similar configuration can be implemented.

If the check of the implicit EAB mask indicates that the class of the mobile device is not barred, then while the rotation timer $T_{rotation}$ is running the mobile device can access the resources of the cellular communication system (Block 359). Similarly, if the check of the implicit EAB mask indicates that the class of the mobile device is barred, then while rotation timer $T_{rotation}$ is running the mobile device cannot access the resources of the cellular communication system (Block 357). After determining whether or not it can access the resources of the cellular communication system the mobile device monitors the status of the rotation timer $T_{rotation}$ (Block 361). If additional system information is received while the rotation timer $T_{rotation}$ is running (Block 363) then the mobile device checks whether a newly received EAB mask is different than the implicit EAB mask of the mobile device. The difference can be measured in terms of differences in set bits, percentage of set bits or similar comparison. If a new EAB mask or a new EAB rotation speed 's' parameter has been received, then the process restarts by setting the new EAB mask as the implicit EAB mask for the mobile device (Block 303). However, if a new EAB mask or a new EAB rotation speed 's' parameter is not received then mobile device continues to monitor the status of the rotation timer $T_{rotation}$ (Block 361).

The rotation timer continues to run (count down) until it expires (Block 361). After the expiration of the rotation timer, the implicit EAB mask is updated by shifting the EAB mask (Block 365). The shift can be a left shift or right shift of the bits. The shift in either direction is cyclical with the bits 'falling' off one end being rotated to the other end of the set of bits such that the total number of 1's in the implicit EAB mask remains constant. In some embodiments, the shift can be a single bit shift, while in other embodiments, the shift can be a multiple bit shift. After the shift completes the process continues by re-starting the rotation timer (Block 353) and checking the implicit EAB mask again (Block 355). The rotation timer process continues until new system information provides a new EAB mask or a new EAB rotation speed 's' parameter, which restarts the process with the offset process of FIG. 3A.

Figure 4:
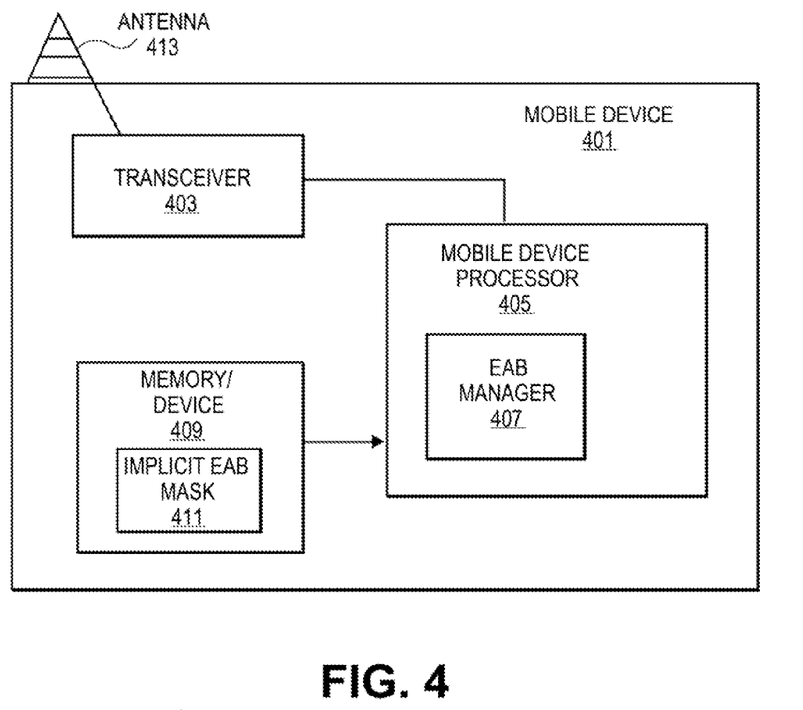
FIG. 4 is a diagram of a mobile device implementing the implicit EAB shifting process.

FIG. 4 is a diagram of a mobile device implementing the implicit EAB shifting process. The example mobile device 401 includes a processor 405, a memory or storage device 409, a transceiver 403, and an antenna 413. In particular embodiments, some or all of the functionality described above as being provided by mobile devices or other forms of user equipment (UE) can be provided by a mobile device 401 with a processor executing instructions stored on a computer-readable medium, such as the memory or storage device 409. Alternative embodiments of the mobile device can include additional components beyond those shown that can be responsible for providing certain aspects of the mobile device functionality, including any of the functionality described above and/or any functionality necessary to support the solution described above.

The transceiver 403 in conjunction with the antenna 413 provides communication capabilities between the mobile device 401 and the base station. The mobile device 401 can include a single antenna or can include multiple antennas enabling the mobile device 401 to transmit over separate frequencies or over a spread spectrum. Any number of transceivers 403 can provide communication capabilities compatible with any type of cellular communication systems including GSM/EDGE, WCDM/HSPA, LTE and similar communication systems.

A single or set of mobile device processors 405 can support the functions of the mobile device can execute the processes described herein as well as other processes of the mobile device 401. The mobile device processor 405 can execute an operating system and any combination of other software. In one embodiment, the mobile device processor 405 executes an EAB manager. The EAB manager 407 implements the offset process and rotation process described herein above. In other embodiments, the functions of the EAB manager 407 are implemented in separate components.

The memory or storage device 409 can store the EAB implicit mask 411 that is utilized by the offset and rotation process. The code of the EAB manager 407 can also be stored in the memory or storage device 409. The memory or storage device 409 can be any type of data storage device including random access storage devices, persistent storage devices or similar devices.

Figure 5:
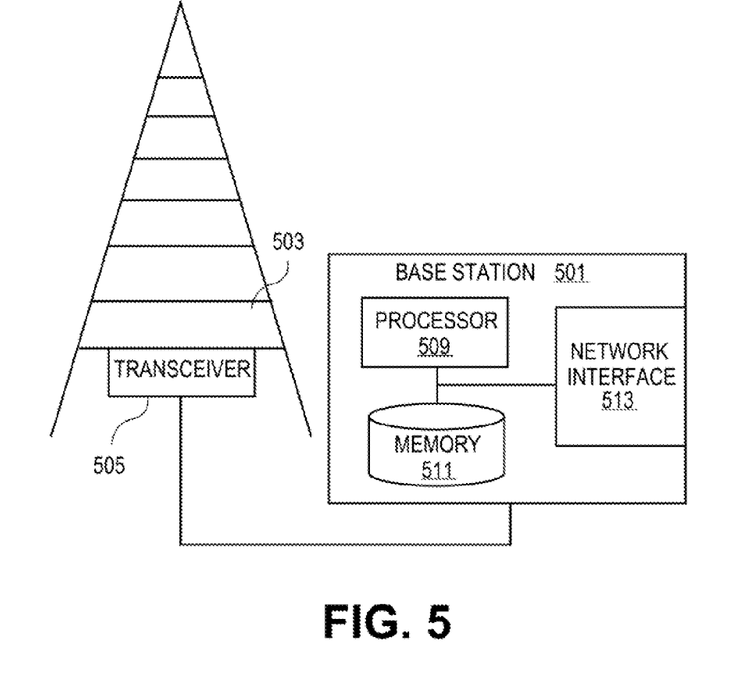
FIG. 5 is a diagram of a base station transmitting the EAB mask.

FIG. 5 is a diagram of a base station 501 transmitting the EAB mask. The base station includes a processor 509, a memory or storage device 511, a network interface 513, a transceiver 505, and an antenna 503. In particular embodiments, some or all of the functionality described above as being provided by a base station, a base station controller, a node B, an enhanced node B, and/or any other type of mobile communications node can be provided by a base station processor 509 executing instructions stored on a computer-readable medium, such as instructions stored in the memory or storage device 511. Alternative embodiments of the base station can include additional components responsible for providing additional functionality, including any of the functionality identified above and/or any functionality necessary to support the solution described above.

The transceiver 505 and antenna 503 enable communication with mobile devices using any communication technology including GSM/EDGE, WCDMA/HSPA, LTE or similar technologies. The network interface 513 provides communication between the base station and other components of the network and connectivity with a wide area network (e.g., with the Internet) as well as other base stations and mobile devices in the cellular communication system.

Thus, a method, system and apparatus for a process for an enhanced EAB process including an offset process and a rotation process to diminish overloading of cellular communication system resources has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method in a mobile device for managing access to resources of a cellular communication system, the cellular communication system including a plurality of base stations providing wireless access to the resources of the cellular communication system, the mobile device implementing an enhanced extended access class barring (EEAB) process to minimize overloading of the resources of the cellular communication system, the method comprising the steps of:
   receiving system information from one of the plurality of base stations, the system information including an EAB bit mask and a shared rotation interval parameter, wherein each bit in the EAB bit mask indicates if a particular class of mobile devices connected to the cellular communication system is barred, and the shared rotation interval parameter is used by the mobile devices to determine intervals for rotating bits of their EAB bit masks;
   setting an implicit EAB bit mask for the mobile device using the received EAB bit mask, where the implicit EAB bit mask serves as a local working copy of the EAB bit mask;
   calculating a random offset using the received shared rotation interval parameter;
   starting an offset timer using the random offset;
   checking the implicit EAB bit mask to determine whether a class of the mobile device is barred;
   if the class of the mobile device is not barred, then enabling data access to the resources of the cellular communication system while the offset timer is active;
   if the class of the mobile device is barred, then baring data access to the resources of the cellular communication system while the offset timer is active; and
   checking whether the offset timer has expired;
   if the offset timer has expired, then updating the implicit EAB bit mask by rotating bits of the implicit EAB bit mask, otherwise continuing to check for the offset timer to expire.

2. The method of claim 1, further comprising the step of:
   checking whether a new EAB bit mask is received within new system information received from the base station or whether a new shared rotation interval parameter is received within the new system information while the offset timer is active.

3. The method of claim 2, wherein checking whether the new system information includes the new EAB bit mask comprises determining whether a number of set bits that differs between the implicit EAB bit mask and the new EAB bit mask exceeds a threshold.

4. The method of claim 2, wherein checking whether the new system information includes the new shared rotation interval parameter comprises determining whether the new shared rotation interval parameter differs from the shared rotation interval parameter.

5. The method of claim 1, further comprising the step of:
   setting a rotation timer using the shared rotation interval parameter after the offset timer expired and the implicit EAB bit mask is updated and starting the rotation timer.

6. The method of claim 5, further comprising the step of:
   checking the implicit EAB bit mask to determine whether the class of the mobile device is barred;
   if the class of the mobile device is not barred, then enabling data access to the resources of the cellular communication system while the rotation timer is active; and
   if the class of the mobile device is barred, then baring data access to the resources of the cellular communication system while the rotation timer is active.

7. The method of claim 6, further comprising the step of:
   checking whether the rotation timer has expired;

if the rotation timer has expired, then updating the implicit EAB bit mask by rotating bits of the implicit EAB bit mask and restarting the rotation timer, otherwise continuing to check for the rotation timer to expire.

8. The method of claim 7, further comprising the step of: checking whether new system information received from the base station includes a new EAB bit mask or the new shared rotation interval parameter while the rotation timer is active.

9. The method of claim 7, further comprising the step of: repeating the checking of the implicit EAB bit mask to determine whether data access to the resources of the cellular communication system is barred after the updating of the implicit EAB bit mask.

10. A mobile device for managing access to resources of a cellular communication system, the cellular communication system including a plurality of base stations providing wireless access to the resources of the cellular communication system, the mobile device implementing an enhanced extended access class barring (EEAB) process to minimize overloading of the resources of the cellular communication system, the mobile device comprising
 a transceiver configured to receive system information from one of the plurality of base stations, the system information including an EAB bit mask and a shared rotation interval parameter, wherein each bit in the EAB bit mask indicates if a particular class of mobile devices connected to the cellular communication system is barred, and the shared rotation interval parameter is used by the mobile devices to determine intervals for rotating bits of their EAB bit masks;
 a memory device to store an implicit EAB bit mask for the mobile device derived from the received EAB bit mask; and
 a mobile device processor configured to execute an EAB manager that is configured to set the implicit EAB bit mask for the mobile device using the received EAB bit mask, where the implicit EAB bit mask serves as a local working copy of the EAB bit mask, to calculate a random offset using the received shared rotation interval parameter, to start an offset timer using the random offset, to check the implicit EAB bit mask to determine whether a class of the mobile device is barred, if the class of the mobile device is not barred, then to enable data access to the resources of the cellular communication system, if the class of the mobile device is barred, then to bar data access to the resources of the cellular communication system, to check whether the offset timer has expired, if the offset timer has expired, then to update the implicit EAB bit mask by rotating bits of the implicit EAB bit mask, otherwise to continue to check for the offset timer to expire.

11. The mobile device of claim 10, wherein the EAB manager is further configured to check whether new system information received from the base station includes a new EAB bit mask or a new shared rotation interval parameter while the offset timer is active.

12. The mobile device of claim 11, wherein the EAB manager is configured to determine whether a number of set bits that differs between the implicit EAB bit mask and the new EAB bit mask exceeds a threshold.

13. The mobile device of claim 11, wherein the EAB manager is configured to determine whether the new system information includes the new shared rotation interval parameter that differs from the shared rotation interval parameter.

14. The mobile device of claim 10, wherein the EAB manager is further configured to detect the expiration of the offset timer and respond by setting a rotation timer using the shared rotation interval parameter and starting the rotation timer.

15. The mobile device of claim 14, wherein the EAB manager is further configured to check the implicit EAB bit mask to determine whether the class of the mobile device is barred, if the class of the mobile device is not barred to enable data access to the resources of the cellular communication system while the rotation timer is active, and if the class of the mobile device is barred, then to bar data access to the resources of the cellular communication system while the rotation timer is active.

16. The mobile device of claim 15, wherein the EAB manager is further configured check whether the rotation timer has expired, and if the rotation timer has expired to update the implicit EAB bit mask by rotating bits of the implicit EAB bit mask and restarting the rotation timer, otherwise to continue to check for the rotation timer to expire.

17. The mobile device of claim 16, wherein the EAB manager is further configured to check whether new system information received from the base station includes a new EAB bit mask or the new shared rotation interval parameter while the rotation timer is active.

18. The mobile device of claim 16, wherein the EAB manager is further configured to repeat the checking of the implicit EAB bit mask to determine whether data access to the resources of the cellular communication system is barred after each updating of the implicit EAB bit mask.

* * * * *